United States Patent Office 3,536,722
Patented Oct. 27, 1970

3,536,722
PIPERIDINE-N-OXYL-SPIRO-HYDANTOIN DERIVATIVES
Keisuke Murayama, Syoji Morimura, and Tetsuya Tanaka, Tokyo, Japan, assignors to Sankyo Company Limited, Chyuo-ku, Tokyo, Japan
No Drawing. Filed Aug. 30, 1967, Ser. No. 664,260
Int. Cl. C07d 49/32
U.S. Cl. 260—294                    4 Claims

ABSTRACT OF THE DISCLOSURE

Novel 7,7-disubstituted-9,9-dimethylpiperidine-8-oxyl-spiro-hydantoin derivatives which are useful as light stabilizers for polyolefins. Novel 7,7 - disubstituted-9,9-dimethyl-piperidine-8-oxyl-spiro-hydantoin derivatives are prepared by treating 7,7-disubstituted-9,9-dimethylpiperidine-spiro-hydantoin derivatives with a peroxide or by reacting 2,2 - dimethyl-6,6-disubstituted-4-oxopiperidine-1-oxyl with an alkali metal cyanide and ammonium carbonate.

---

This invention relates to a novel class of piperidine-N-oxyl-spiro-hydantoin derivatives and also to a process for preparing the same.

More particularly, it relates to the piperidine-N-oxyl-spiro-hydantoin derivatives having the formula

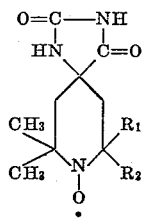

(I)

wherein $R_1$ and $R_2$ may be the same or different and represent alkyl group or they may be joined together with the carbon atom to which they are attached to form a 5- or 6-membered saturated homocyclic ring or the group of the formula

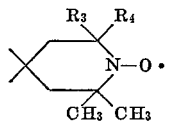

(wherein $R_3$ and $R_4$ may be the same or different and represent alkyl group).

Also, it is concerned with a process for the preparation of the said piperidine-N-oxyl-spiro-hydantoin derivatives (I).

In the above Formula I, each of the groups $R_1$ and $R_2$ may be illustratively represented by the following groups; e.g. methyl, ethyl, n-propyl, isopropyl, n-butyl, isobutyl, sec.-butyl, tert.-butyl, hexyl, octyl, decyl and dodecyl. The cyclic groups which may be formed by the groups $R_1$ and $R_2$ may be illustratively represented by the following groups, e.g.,

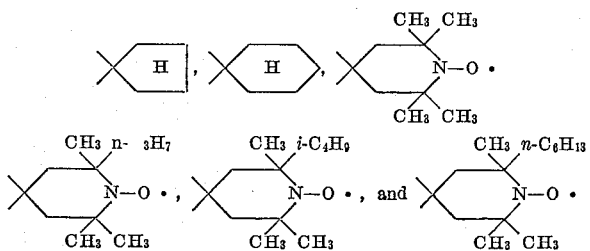

The piperidine-N-oxyl-spiro-hydantoin derivatives having the above Formula I are novel compounds unknown in the prior art. They exhibit exceptionally high stabilizing effect against photo-deterioration of polyolefins, including polyethylene, polypropylene, other polyolefins, e.g. polybutadiene and olefin copolymers such as ethylenepropylene copolymers, styrene-butadiene copolymers and acrylonitrile-butadiene-styrene copolymers. Thus, these novel piperidine-N-oxyl-spiro-hydantoin derivatives are valuable as light stabilizers for various types of polyolefins.

It is, accordingly, a principal object of this invention to provide a new class of the piperidine-N-oxyl-spiro-hydantoin derivatives having the above Formula I which are useful as light stabilizers for polyolefins against photo-deterioration. Another object of this invention is to provide a novel and commercially advantageous process for the preparation of the piperidine-N-oxyl-spiro-hydantoin derivatives having the above Formula I. These and other objects of this invention will be apparent from the following detailed description.

In accordance with this invention, the piperidine-N-oxyl-spiro-hydantoin derivatives having the above Formula I can be prepared by a novel process which comprises (A) treating the piperidine-spiro-hydantoin derivatives having the formula

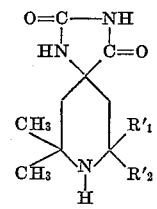

(II)

wherein $R'_1$ and $R'_2$ may be the same or different and represent alkyl group or they may be joined together with the carbon atom to which they are attached to form a 5- or 6- membered saturated homocyclic ring or the group of the formula

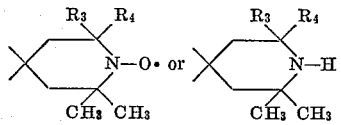

(wherein $R_3$ and $R_4$ are as defined above) with a peroxide or (B) reacting the piperidine-N-oxyl derivatives having the formula

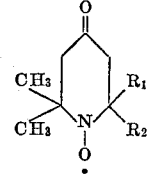

(III)

wherein $R_1$ and $R_2$ are as defined above with an alkali metal cyanide and ammonium carbonate.

In one embodiment of the process of this invention, the reaction may be preferably carried out by treating the piperidine-spiro-hydantoin derivative (II) with a peroxide.

Suitable examples of the peroxide to be employed in this embodiment include hydrogen peroxide, an organic peracid and the like. Suitable examples of the organic peracid are peracetic acid, perbenzoic acid, substituted-perbenzoic acids and the like.

Where hydrogen peroxide is employed as an oxidizing agent in this embodiment, it is preferable to conduct oxidation reaction in the presence of a catalyst for oxidation, more preferably together with a promoter, since the increased yield of the desired product could be obtained. There may be satisfactorily employed any of those catalysts for oxidation, but alkali metal salts of such inorganic acid as tungstic, phosphotungstic and phosphomolybdic acids and vanadium oxide are preferable as a catalyst and ethylenediaminetetraacetic acid as a promoter. In this case, the reaction of this embodiment may also be conveniently conducted in the presence of a suitable reaction solvent such as water and inert organic solvents, e.g. methanol, acetic acid, and the like. The reaction temperature and period are not critical, but the reaction is usually conducted at ordinary temperature, and preferably at a higher temperature up to about 50° C. by heating in order to promote the reaction proceeding, for about 10–30 hours.

Where an organic peracid is employed as an oxidizing agent, the reaction may be conveniently conducted at ordinary temperature, but it may be more preferable to employ any of conventional external cooling means to about 0–10° C. during the addition of an organic peracid, since initially the exothermic reaction may occur. The reaction may also be preferably conducted in the presence of a suitable reaction solvent; for instance preferable being water, acetic acid, ethyl acetate, methylene chloride and the like for peracetic acid and ether, benzene, chloroform and the like for perbenzoic acid and substituted-perbenzoic acid.

The desired product, i.e. the piperidine-N-oxyl-spiro-hydantoin of the above Formula I may be recovered from the reaction mixture, for instance, by admixing either the crystalline substance collected by filtration, if separated out in situ, or the reaction mixture, if not, with a saturated aqueous solution of a suitable alkali such as hydroxides and carbonates of sodium, potassium, calcium and barium and the like at ordinary temperature for about 1–3 hours, and then either recovering by filtration the crystalline substance precipitated or extracting the resulting mixture with a suitable organic solvent such as benzene, ether, methyl ethyl ketone and the like and then removing the solvent by distillation. The crude product thus obtained may be further purified, for instance, by recrystallization from a suitable organic solvent such as methanol, benzene, methyl ethyl ketone and the like, if desired.

In this embodiment, it will be noted that the group of the formula

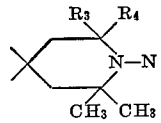

(wherein $R_3$ and $R_4$ are as defined above) within the definition of the $R_1$ and $R_2$ in the Formula II representing the starting hydantoin be converted by oxidation to the group of the formula

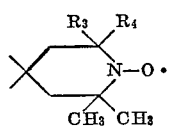

(wherein $R_3$ and $R_4$ are as defined above).

The piperidine-spiro-hydantoin derivatives of the above Formula II which are employed as a starting material in this embodiment are novel compounds with exception of 1,3,8-triaza-7,7,9,9-tetramethyl-2,4-dioxo-spiro[4.5]decane. These novel compounds may be easily prepared by reacting diacetoneamine with a ketone of the formula

(wherein $R_5$ and $R_6$ are those groups as defined in the $R_1$ and $R_2$ with exception of the case where both $R_1$ and $R_2$ represent methyl group) in the presence of an inorganic salt to form the 4-oxopiperidine of the formula

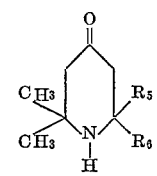

(wherein $R_5$ and $R_6$ are as defined above) and then reacting the latter product thus formed with an alkali metal cyanide and ammonium carbonate, according to the teachings by E. A. Mailey and A. R. Day in the Journal of Organic Chemistry, 22, 1061 (1957).

In another embodiment of the process of this invention, the reaction may be preferably conducted by reacting the starting piperidine-N-oxyl (III) with an alkali metal cyanide and ammonium carbonate in the presence of a suitable organic solvent such as alcohols, e.g. methanol and ethanol, and the like. Suitable examples of the alkali metal cyanide to be employed in this embodiment are sodium cyanide, potassium cyanide and the like. The reaction temperature and period in this embodiment are not critical, but it is usual and preferable to conduct the reaction at a temperature of about 40–90° C. for about 5–10 hours. The order of sequence in adding the reactants are not critical, but generally it is desirable to add the starting piperidine-N-oxyl (III) to a suitable organic solvent followed by addition of a suitable alkali metal cyanide and ammonium carbonate. After completion of the reaction, the desired product, i.e. the piperidine-N-oxylspiro-hydantoin of the above Formula I may be readily recovered and purified by a conventional means such as filtration, recrystallization and the like.

The piperidine-N-oxyls of the above Formula III which are employed as a starting material in this embodiment are novel compounds with exception of 2,2,6,6-tetramethyl-4-oxopiperidine-1-oxyl. These novel compounds can be easily prepared by reacting diacetone amine with a ketone of the formula

(wherein $R_5$ and $R_6$ are those groups as defined in the $R_1$ and $R_2$, with exception of the case where both $R_1$ and $R_2$ represent methyl group) in the presence of an inorganic salt to form the 4-oxopiperidine of the formula

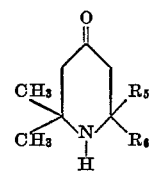

(wherein $R_5$ and $R_6$ are as defined above) and then treating the latter product thus formed with a peroxide.

The process of this invention as depicted hereinabove may be schematically shown by the following flow sheet:

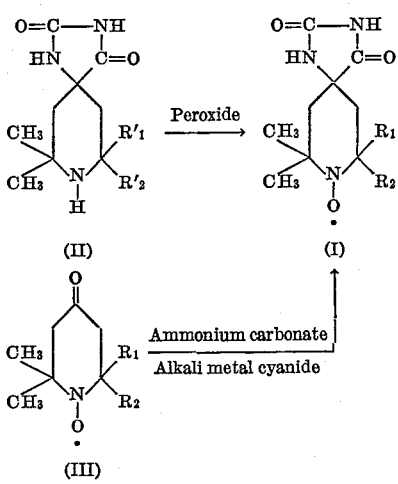

wherein $R_1$, $R_2$, $R'_1$ and $R'_2$ are as defined above.

The following examples serve to illustrate this invention without intending to limit it thereto.

EXAMPLE 1

Preparation of 1,3,8-triaza-7,7,9,9-tetramethyl-2,4-dioxo-spiro[4,5]decane-8-oxyl To a solution of 20 g. of 1,3,8-triaza-7,7,9,9-tetramethyl-2,4-dioxo-spiro[4,5]decane in 80 ml. of acetic acid was added 0.5 g. of ethylenediaminetetraacetic acid, 0.4 g. of sodium tungstate and then 40 ml. of 30% hydrogen peroxide. The resulting mixture was stirred at room temperature for 7 days. Then, the reaction mixture was concentrated under reduced pressure, and to the residue thus obtained was added a saturated aqueous solution of potassium carbonate and then the resulting mixture was stirred at room temperature for 1 hour. Thereafter, the crystalline substance precipitated was recovered by filtration, washed with water and then recrystallized from aqueous ethanol to give the desired product melting at 331° C. (decomp.).

Analysis.—Calculated for $C_{11}H_{18}O_3N_3$ (percent): C, 54.98; H, 7.55; N, 17.49. Found (percent): C, 55.19; H, 7.67; N, 17.45.

The electron spin resonance spectrum (in tetrahydrofuran) of the product thus obtained showed a strong triplet of a hyperfine coupling constant 15.3 oe. (oersted), which triplet would be given by the splitting due to the interaction of the unpaired electron spin with nuclear spin of the N atom in the piperidine ring. This result evidently demonstrates the presence of a stable N-oxyl free radical in the product.

EXAMPLE 2

Preparation of cyclohexane-1-spiro-2'-(6',6'-dimethyl-piperidine-1'-oxyl)-4'-spiro-5''-hydantoin To a solution of 2 g. of cyclohexane-1-spiro-2'-(6',6'-dimethylpiperidine)-4'-spiro-5''-hydantoin in 30 ml. of acetic acid was added successively 0.1 g. of ethylenediaminetetraacetic acid and 0.12 g. of sodium tungstate and then to the resulting mixture was added dropwise with stirring 6 ml. of 30% hydrogen peroxide. The mixture thus obtained was stirred at room temperature for 5 days. Then, the reaction mixture was treated in the same manner as in the above Example 1 to give the desired product melting at 282–283.5° C.

Analysis.—Calculated for $C_{14}H_{22}O_3N_3$ (percent): C, 59.98; H, 7.91; N, 14.99. Found (percent): C, 60.07; H, 8.00; N, 14.85.

EXAMPLE 3

Preparation of (2,2,6,6-tetramethylpiperidine-1-oxyl)-4-spiro - 2'-(6',6'-dimethylpiperidine-1-oxyl)-4'-spiro-5''-hydantoin To a solution of 2.6 g. of (2,2,6,6-tetramethylpiperidine)-4-spiro-2'-(6',6'-dimethylpiperidine)-4' - spiro - 5''-hydantoin in 30 ml. of acetic acid was added dropwise at 0–5° C. 30 ml. of a 9% peracetic acid solution in acetic acid. The resulting mixture was stirred at room temperature for 20 hours. The reaction mixture was then treated in the same manner as in Example 1 to give the desired product melting at 212–213° C.

Analysis.—Calculated for $C_{17}H_{28}O_4N_4$ (percent): C, 57.93; H, 8.01; N, 15.90. Found (percent): C, 57.78; H, 7.88; N, 15.87.

Similarly, there were obtained the following piperidine-N-oxyl-spiro-hydantoin derivatives:

1,3,8-triaza-7,9,9-trimethyl-7-n-hexyl-2,4-dioxo-spiro [4,5]decane-8-oxyl,
1,3,8-triaza-7,9,9-trimethyl-7-isobutyl-2,4-dioxo-spiro [4.5] decane-8-oxyl,
1,3,8-triaza-7,7-diisobutyl-9,9-dimethyl-2,4-dioxo-spiro [4.5] decane-8-oxyl, and
cyclopentane-1-spiro-2'-(6',6'-dimethylpiperidine-1'-oxyl)-4'-spiro-5''-hydantoin.

EXAMPLE 4

Preparation of 1,3,8-triaza-7,7,9,9-tetramethyl-2,4-dioxo-spiro [4.5] decane-8-oxyl A solution of [5.5] g. of 2,2,6,6-tetramethyl-4-oxo-piperidine-1-oxyl, 1.6 g. of sodium cyanide and 9.9 g. of ammonium carbonate in 80 ml. of 50% aqueous ethanol was stirred at 55–60° C. for 8 hours. After cooling, the crystalline substance precipitated was recovered by filtration and then recrystallized from aqueous ethanol to give the desired product melting at 313° C. (decomp.)

Analysis.—Calculated for $C_{11}H_{18}O_3N_3$ (percent): C, 54.98; H, 7.55; N, 17.49. Found (percent): C, 55.19; H, 7.67; N, 17.45.

The electron spin resonance spectrum (in tetrahydrofuran) of the product thus obtained showed a strong triplet of a hyperfine coupling constant 15.3 oe. (oersted), which triplet would be given by the splitting due to the interaction of the unpaired electron spin with nuclear spin of the N atom in the piperidine ring. This result evidently demonstrates the presence of a stable N-oxyl free radical in the product.

EXAMPLE 5

Preparation of cyclohexane-1-spiro-2'-(6',6'-dimethyl-piperidine-1'-oxyl)-4'-spiro-5''-hydantoin A solution of 1.1 g. of 1-aza-2,2-dimethyl-4-oxo-spiro [5.5] undecane-1-oxyl, 0.4 g. of sodium cyanide and 2.5 g. of ammonium carbonate in 20 ml. of 50% aqueous ethanol was stirred at 50–60° C. for 7 hours. Then, the reaction mixture was ice cooled and the crystalline substance precipitated was recovered by filtration, washed with water and then recrystallized from aqueous ethanol to give the desired product melting at 282–283.5° C.

Analysis.—Calculated for $C_{14}H_{22}O_3N_3$ (percent): C, 59.98; H, 7.91; N, 14.99. Found (percent): C, 59.79; H, 7.82; N, 15.18.

EXAMPLE 6

Preparation of (2,2,6,6-tetramethylpiperidine-1-oxyl)-4-spiro-2'-(6',6'-dimethylpiperidine-1 - oxyl)-4'-spiro-5''-hydantoin A solution of 4.8 g. of 1,9-diaza-2,2,8,8,10,10-hexamethyl-4-oxo-spiro [5.5] undecane-1,9-dioxyl, 1.4 g. of sodium cyanide and 8.3 g. of ammonium carbonate in 70 ml. of 50% aqueous ethanol was stirred at 60–70° C. for 8 hours. After cooling, the crystalline substance precipitated was recovered by filtration, washed with water and then recrystallized from aqueous ethanol to give the desired product melting at 212–213° C.

*Analysis.*—Calculated for $C_{17}H_{28}O_4N_4$ (percent): C, 57.93; H, 8.01; N, 15.90. Found (percent): C, 57.87; H, 7.89; N, 15.95.

Similarly, there were obtained the following piperidine-N-oxyl-spiro-hydantoin derivatives:

1,3,8-triaza-7,9,9-trimethyl-7-n-hexyl-2,4-dioxo-spiro [4.5] decane-8-oxyl,
1,3,8-triaza-7,9,9-trimethyl-7-isobutyl-2,4-dioxo-spiro [4.5] decane-8-oxyl,
1,3,8-triaza-7,7-diisobutyl-9,9-dimethyl-2,4-dioxo-spiro [4.5] decane-8-oxyl, and
cyclopentane-1-spiro-2'-(6',6'-dimethylpiperidine-1'-oxyl)-4'-spiro-5''-hydantoin.

What is claimed is:
1. A compound having the formula

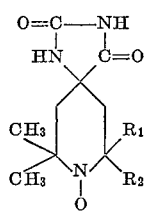

wherein $R_1$ and $R_2$ may be the same or different and represent alkyl of 1 to 6 carbon atoms or they may be joined together with the carbon atom to which they are attached to form cyclopentane or cyclohexane ring or the group of the formula

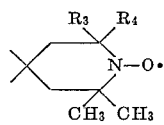

wherein $R_3$ and $R_4$ may be the same or different and represent alkyl of 1–6 carbon atoms.

2. 1,3,8 - triaza - 7,7,9,9 - tetramethyl-2,4-dioxo-spiro [4.5] decane-8-oxyl.

3. Cyclohexane-1-spiro-2'-(6',6'-dimethyl - piperidine-1'-oxyl)-4'-spiro-5''-hydantoin.

4. (2,2,6,6 - tetramethylpiperidine - 1 - oxyl)-4-spiro-2'-(6',6'-dimethylpiperidine-1-oxyl)-4'-spiro-5''-hydantoin.

References Cited

UNITED STATES PATENTS 3,330,836   7/1967   Griot _____ 260—294.3

OTHER REFERENCES

Rozantsev et al., Izv. Akad. Nauk SSSR, Ser. Khim. 1965 (2), 391–3.

Rozantsev et al., Izv. Akad. Nauk SSSR, Ser. Khim. 1965 (2), 393–4.

HENRY R. GILES, Primary Examiner

G. T. TODD, Assistant Examiner

U.S. Cl. X.R.

260—45.8

Disclaimer 3,536,722.—*Keisuke Murayama*, *Syoji Morimura*, and *Tetsuya Tanaka*, Tokyo, Japan. PIPERIDINE-N-OXYL-SPIRO-HYDANTOIN DERIVATIVES. Patent dated Oct. 27, 1970. Disclaimer filed Oct. 11, 1974, by the assignee, *Sankyo Company, Limited*.

Hereby enters this disclaimer to claims 1 and 2 of said patent.

[*Official Gazette July 8, 1975.*]